May 14, 1929.  E. L. RUHL ET AL  1,713,450
AEROPLANE CONSTRUCTION
Filed Oct. 17, 1927
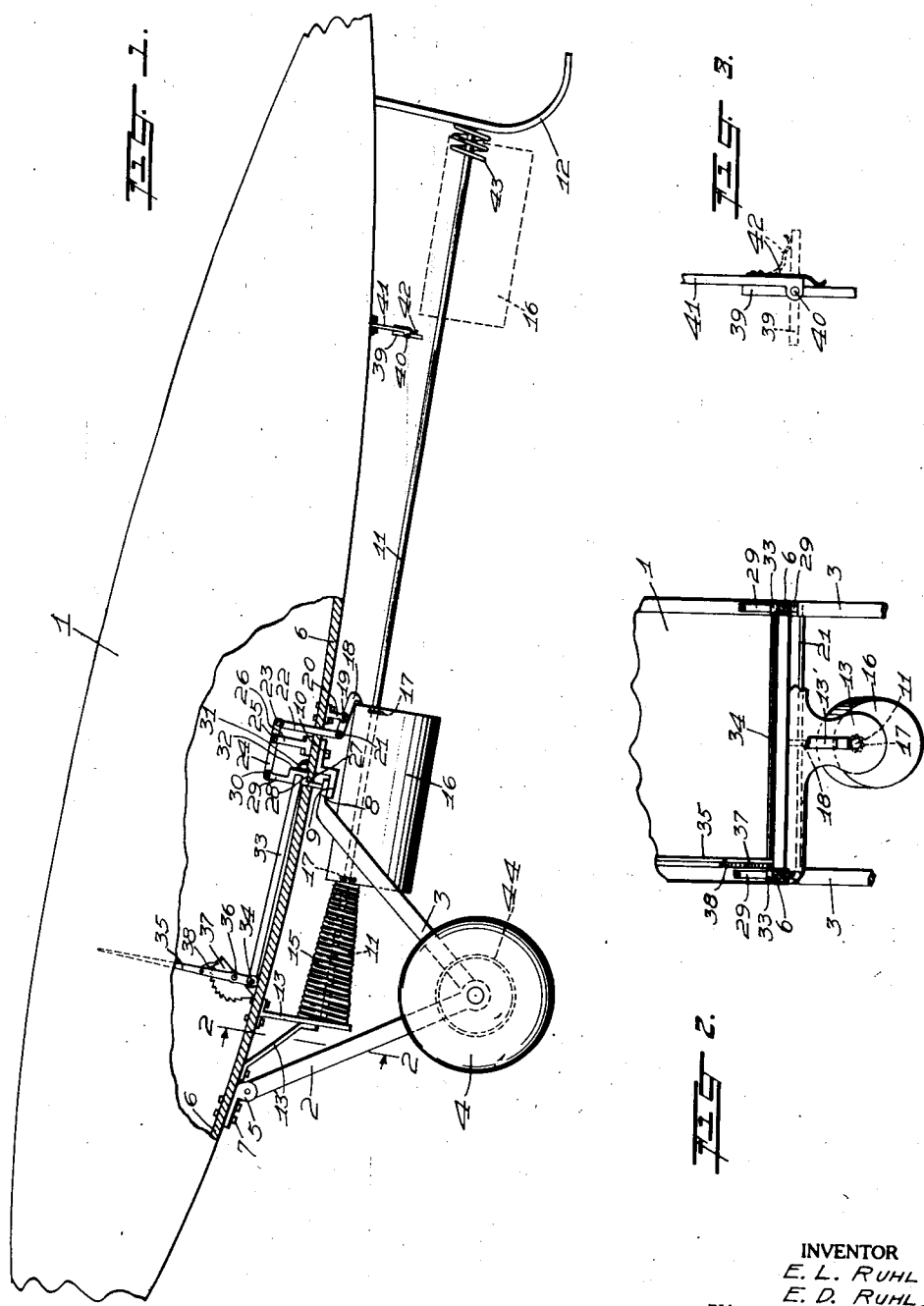
INVENTOR
E. L. RUHL
E. D. RUHL
BY Munn & Co.
ATTORNEYS Patented May 14, 1929.

1,713,450

UNITED STATES PATENT OFFICE.

EDWARD L. RUHL AND EVA D. RUHL, OF CHICAGO, ILLINOIS.

AEROPLANE CONSTRUCTION.

Application filed October 17, 1927. Serial No. 226,663.

Our invention relates to improvements in aeroplane constructions, and it consists in the combinations, constructions, and arrangements herein described and claimed.

In the construction of aeroplanes, it is particularly important that the center of gravity of the plane be properly located, that is to say, the weight must be distributed in such a way as to permit the ready control of the machine in flying. The conditions in flying and in landing, however, are different. In landing, there is a tendency for the forward end of the machine to tilt downwardly when the landing gear first makes contact with the ground, due to the resistance offered by the ground and to the momentum of the plane. In order to prevent the nose of the plane from diving into the ground, careful manipulation of the plane is necessary.

An object of our invention is to provide means whereby the shifting of the center of gravity of the plane may take place instantly and automatically when the landing gear first comes in contact with the ground so as to bring the center of gravity to the rear of the normal position which it would have when flying, thereby keeping the nose of the device elevated and depressing the tail.

A further object of the invention is to provide means for positively locking, during normal flight, the device which shifts the center of gravity and for permitting the operator to unlock the device immediately prior to landing so as to permit its automatic operation.

A further object of the invention is to provide an aeroplane in which the means employed for the shifting of the center of gravity of the plane permits the landing gear wheels to be braked, thereby providing an aeroplane which may be landed upon a relatively small field or upon house tops and other similar constructions.

Other objects and advantages will appear in the following specification, and the novel features of the invention will be particularly pointed out in the appended claims.

Our invention is illustrated in the accompanying drawings, forming part of this application, in which—

Figure 1 is a side elevation of an aeroplane, partly in section, embodying our invention, Figure 2 is a sectional view taken along the line 2—2 of Figure 1, and Figure 3 is an enlarged detail view of a portion of our invention.

In carrying out our invention, we provide an aeroplane fuselage 1, such as that shown in Figure 1. The fuselage 1 is provided with a landing gear consisting of a pair of front brace members 2 and a pair of rear brace members 3. The front brace members 2 and the rear brace members 3 are arranged to support landing gear wheels 4. The front brace members 2 are pivotally mounted by means of brackets 5 to the aeroplane fuselage 1, see Figure 1. The brackets 5 are firmly secured to the longérons 6 by means of bolts 7.

The rear brace members 3 are provided with bent portions 8 which are movably supported underneath the fuselage 1 by means of guide members 9. The guide members 9 are secured to the longérons 6 by means of bolts 10.

A relatively long tubular guide member 11 is secured to the fuselage 1. The rear end of the tubular guide member 11 is mounted upon a tail skid 12, such as that shown in Figure 1, and the opposite end is secured to a bracket 13, which, in turn, is secured to the longérons 6 by means of bolts 14. Brace members 13' rigidly support the bracket 13. A tapered coil spring 15 is mounted upon the bracket 13 and concentrically disposed with respect to the tubular guide member 11.

A weight 16 is slidably mounted upon the tubular guide member 11. It will be seen from Figure 1 that the weight 16 is provided with roller bearings 17 arranged to run upon the tubular guide member 11, thereby permitting the weight 16 to be moved freely upon the tubular guide member 11. Referring to Figure 1, it will be seen that the tubular guide member 11 passes through the weight 16 relatively near one side of the weight, thus permitting the use of a relatively large and heavy weight and at the same time permitting the tubular guide member 11 to be mounted relatively near the fuselage 1. When the weight 16 is in the position shown in Figure 1, the coil spring 15 is under tension, as will be explained later.

A release dog 18 is pivotally mounted at 19 by means of a bracket 20 to the under side of the fuselage 1. When flying, the release dog 18 is in engagement with the weight 16, as shown in Figure 1. One end of the release dog 18 is pivotally secured to a shaft 21 extending transversely of the fuselage 1. A link 22 is pivotally secured to each end of the shaft 21 and disposed relatively near the inner sides of the fuselage 1. The links 22 are pivotally connected at 23 with levers 24 pivotally mounted at 25 upon brackets 26.

The bottom of the fuselage 1 is provided with openings 27 and recesses 28 through which trip pins 29 pass. The trip pins 29 are pivotally connected at 30 with the levers 24. Dogs 31 are disposed on each side of the fuselage 1 and arranged to engage teeth 32 on each of the trip pins 29. The trip pins 29, as will be seen from Figure 1, bear against the bent portions 8 of the rear brace members 3, as will be more fully explained later.

Sliding lock members 33 are pivotally connected with a shaft 34 extending transversely of the fuselage 1. A lever 35 is pivotally mounted at 36 to a quadrant 37. The lever 35 is connected with the shaft 34 and is provided with a dog 38 arranged to engage the teeth on the quadrant 37. Thus it will be seen that any movement of the lever 35 will cause a relative movement of the sliding lock members 33.

The weight 16, when moved into the dotted line position shown in Figure 1, passes a locking pin 39 pivoted at 40 to a supporting bracket 41. A spring 42 secured to the supporting bracket 41 is arranged to bear against the locking pin 39, see Figure 3. When the weight 16 has passed the locking pin 39, the spring 42 immediately moves the locking pin 39 into the full line position shown in Figure 3, thus locking the weight 16 in its dotted line position. The weight 16 when passing the locking pin 39 is moving rapidly and in order to decrease the force of the moving weight, we have provided a coil spring 43 which is mounted upon the tail skid 12, as shown in Figure 1.

From the foregoing description of the various parts of the device, the operation thereof may be readily understood. The point of suspension in aeroplanes when the wheels and the tail skid are in contact with the landing field is substantially in a vertical plane transversely through the fuselage and passing through the axes of the landing gear wheels. For this reason, it is sometimes difficult to properly and safely land an aeroplane where the ground is rough or soft, since in such cases the forward end of the aeroplane is thrown downwardly, causing a nosing in of the propeller and damage thereto.

During the flight of an aeroplane equipped with our device, the weight 16 is in the full line position shown in Figure 1; that is, it is locked against the tension of the spring 15 by means of the release dog 18. When the weight is in this position, the trip pins 29 bear against the bent portions 8 of the rear brace members 3, at which time the sliding lock members 33 are moved into engagement with the trip pins 29; thus preventing movement of the latter so that the release dog is firmly locked in position.

In landing, just before the wheels 4 strike the ground, the lever 35 is moved so as to cause the sliding lock members 33 to be moved out of engagement with the trip pins 29. When the wheels 4 strike the ground, the rear brace members 3 are moved inwardly against the fuselage 1 so that the bent portions 8 in striking the trip pins 29 will move the latter to cause the lever 24 to pivot, thereby moving the release dog 18 out of engagement with the weight 16. As soon as the release dog 18 is free of the weight 16, the latter will be thrown rearwardly by means of the coil spring 15, past the locking pin 39, and into the dotted line position shown in Figure 1. When the weight is in the latter position, the tail end of the fuselage 1 is held firmly to the ground, thus eliminating all danger of the propeller nosing in.

It will be further seen that our invention permits brakes 44, indicated generally in Figure 1, to be applied to the running gear wheels 4 so as to cause a sudden stopping of the aeroplane as when landing on a small field. Our invention makes it possible to land aeroplanes on relatively small fields or upon roofs of buildings, etc.

After the aeroplane equipped with our invention has landed, the weight 16 is moved manually or by other suitable means into the full line position shown in Figure 1. The lever 35 is actuated to cause the sliding lock members 33 to engage the trip pins 29, thereby moving the release dog 18 into engagement with the weight 16. It will be seen from Figure 1 that when the rear brace members 3 are moved inwardly as a result of the wheels 4 striking the ground, the trip pins 29 will be moved inwardly and locked in the latter position by means of the dogs 31; thus the release dog 18 is held in such a position as to cause no interference with the weight 16 when it is moved from the dotted line position to the full line position.

Since trip pins 29 are provided on each side of the plane, it will be seen that the release dog 18 will be freed from engagement with the weight 16 when one or both of the wheels 4 strike the ground.

We claim:

1. The combination with an aeroplane, of a landing gear carried thereby, and means actuated by the contact of the landing gear with the ground for automatically shifting the center of gravity of the plane to the rear.

2. The combination with an aeroplane, of a landing gear carried thereby, means actuated by the contact of the landing gear with the ground for automatically shifting the center of gravity of the plane to the rear, and means for positively locking the shifting means during normal flight.

3. The combination with an aeroplane, of a landing gear carried thereby, means actuated by the contact of the landing gear with the ground for automatically shifting the center of gravity of the plane to the rear, and means for positively locking the shifting means during normal flight and for unlocking said means at will to permit the operation thereof.

4. The combination with an aeroplane, of a landing gear carried thereby, means actuated by the contact of the landing gear with the ground for automatically shifting the center of gravity of the plane to the rear, guiding means for said means, and means for positively locking the shifting means during normal flight and for unlocking said means at will to permit the operation thereof.

5. The combination of an aeroplane, a landing gear carried thereby, a guide member secured to said aeroplane, balancing means movably mounted upon said guide member and released by said landing gear for shifting the center of gravity of the plane, and means for positively locking the balancing means durnig normal flight and for locking said means at will to permit the operation thereof.

6. The combination of an aeroplane, a landing gear, a guide member secured to said aeroplane, balancing means movably mounted upon said guide member, means for shifting the position of said balancing means, and means for positively locking the balancing means in operative relation to said last-named means and actuated by said landing gear for releasing the balancing means.

7. The combination of an aeroplane, a landing gear, a guide member secured to said aeroplane, balancing means movably mounted upon said guide member, means for shifting the position of said balancing means, means for positively locking the balancing means in operative relation to said last-named means and actuated by said landing gear for releasing the balancing means, and means for holding the balancing means in its shifted position.

8. The combination of an aeroplane, a landing gear, a guide member secured to said aeroplane, balancing means movably mounted upon said guide member, means for shifting the position of said balancing means, means for positively locking the balancing means in operative relation to said last-named means and actuated by said landing gear for releasing the balancing means, means for holding the balancing means in its shifted position, and locking means for locking and releasing said third-named means.

EDWARD L. RUHL.
EVA D. RUHL.